United States Patent [19]

Maistre

[11] 4,254,599

[45] Mar. 10, 1981

[54] ANNULAR THREE-DIMENSIONAL STRUCTURE USABLE IN PARTICULAR AS REINFORCEMENT

[75] Inventor: Michel Maistre, Bordeaux, France

[73] Assignee: Societe Europeenne de Propulsion, France

[21] Appl. No.: 19,571

[22] Filed: Mar. 12, 1979

[30] Foreign Application Priority Data

Mar. 29, 1978 [FR] France .................................. 78 09103

[51] Int. Cl.³ .............................................. E04C 3/26
[52] U.S. Cl. ......................................... 52/224; 52/653
[58] Field of Search ................... 52/80, 224, 653, 222

[56] References Cited

U.S. PATENT DOCUMENTS

| | | | |
|---|---|---|---|
| 3,501,880 | 3/1970 | Bosch | 52/653 X |
| 3,893,270 | 7/1975 | Schupack et al. | 52/224 X |
| 4,092,811 | 6/1978 | Lin et al. | 52/224 |

FOREIGN PATENT DOCUMENTS 979247 1/1965 United Kingdom ...................... 52/653

*Primary Examiner*—J. Karl Bell
*Attorney, Agent, or Firm*—Staas and Halsey

[57] ABSTRACT

The invention relates to an annular three-dimensional structure usable in particular as reinforcement, said structure being formed of a regular criss-cross of elongated filiform elements distributed in four families, the elements of each family being disposed in parallel, regularly spaced apart sheets themselves constituted by elements extending substantially parallel to one another and regularly spaced apart. The elements in each sheet have a different orientation from that of the elements of the adjacent parallel sheet of another family, the elements of at least two families being incurved in opposite directions. The structure appears formed by the regular repetition of a parallelepipedic unit cell containing at least one segment of element of each of the four families, these elements being oriented substantially along the four large diagonals of this parallelepiped and the elementary meshes of the structure conserve substantially the same orientation with respect to the axis of the structure, all around this axis.

16 Claims, 14 Drawing Figures

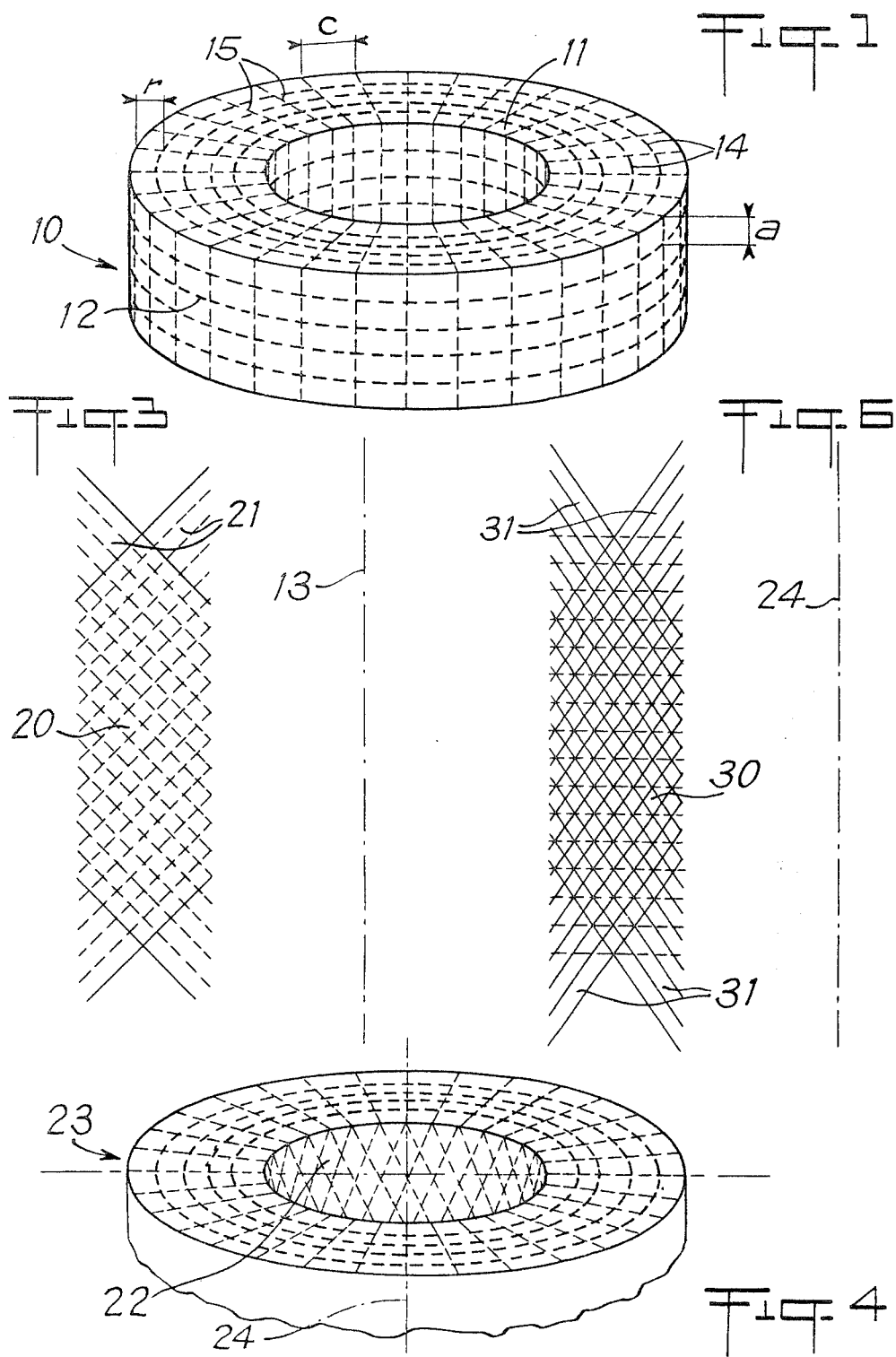

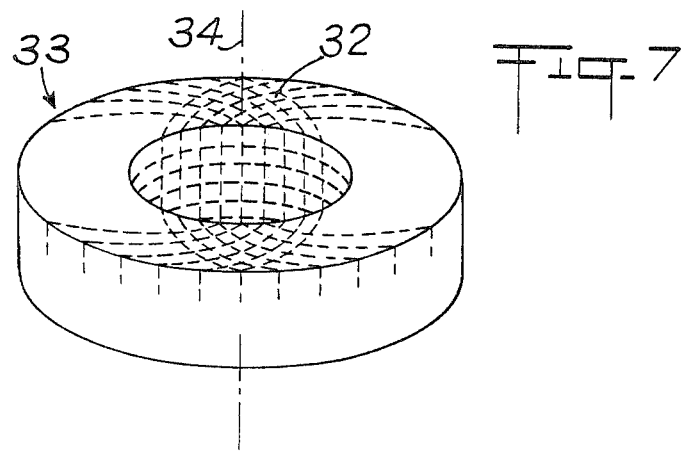
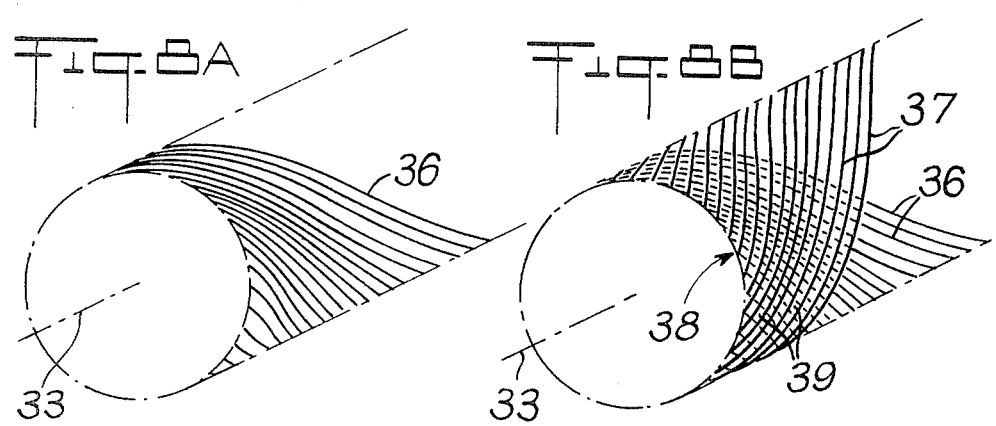
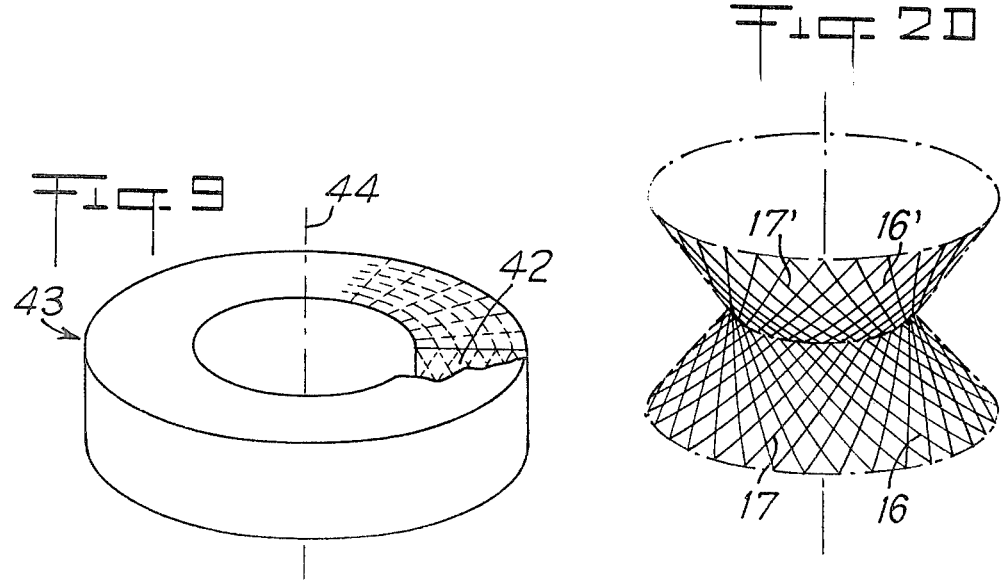

ANNULAR THREE-DIMENSIONAL STRUCTURE USABLE IN PARTICULAR AS REINFORCEMENT

The present invention relates to an annular three-dimensional structure which may be used in particular as reinforcement.

A particular application of such a structure is the production of composite materials capable of resisting severe stesses, particularly mechanical stresses of thermal origin, for example composite materials intended for manufacturing the nozzles of solid propellant rockets.

For such applications, it is desirable to produce a three-dimensional structure composed of elements which occupy a high percentage of the apparent volume of the structure but which, within this structure, create a network of cells or porosities which are largely intercommunicating so as to allow a perfect coating or impregnation when the composite material is manufactured.

These conditions are realised by a structure described in French Pat. No. 2,276,916, structure of the type comprising a regular criss-cross of elongated filiform elements distributed in first, second, third and fourth families, the elements of each family being disposed in parallel, regularly spaced apart sheets themselves constituted by elements extending substantially parallel to one another and being regularly spaced apart, the sheets of the first and second families being alternately disposed in adjacent parallel layers and, similarly, the sheets of the third and fourth families being alternately disposed in adjacent parallel layers, these latter being inclined with respect to those of the first and second families, the elements in each sheet having a different orientation from that of the elements of the adjacent parallel sheet of another family, said structure appearing as being formed by the regular repetition of a basic motif, or unit cell, inscribed in a parallelepiped containing at least one segment of element of each of the four families, these elements being oriented substantially along the four long diagonals of this parallelepiped. In this structure, the adjacent elements of four adjacent families are, in each elementary zone of the structure, occupied by the elements of the four families, oriented substantially along the four long diagonals of a rectangular parallelepiped constituting an unit cell of the structure.

The term unit cell here denotes the cell containing at least one segment of an element of each family and allowing the construction of the complete structure by juxtaposition of similar cells.

It will further be noted that the expression "elongated filiform elements" here covers the elements in the form of threads or rods of circular or polygonal transverse section.

In the known structure forming the subject matter of French Pat. No. 2,276,916, the elements are all rectilinear and constitute families oriented in the four directions which characterise the structure. The very existence of these four preferential directions means that the composite materials manufactured from the known structure do not present a perfect isotropy, particularly from the point of view of the mechancial and thermal properties.

This anisotropy of the known texture is clearly apparent by observing the different aspects in which it may appear in section, as a function of the orientation of the surface of section with respect to the preferential directions of the structure. According to this orientation, the four families of elements may be cut at identical or more or less different angles which may be a zero angle for one of the families or even for two of them simultaneously.

In the applications for which the structural surface characteristics have a determining role, for example when friction, abrasion or ablation occurs, the anisotropy leads to undesirable heterogeneities in the behaviour of the composite material if one is not master of the orientation of the outer surface of the material with respect to the preferential directions of the structure. This is the case, for example, of the use of carbon-carbon composite materials (three-dimensional structure composed of carbon elements impregnated with carbon) for making nozzles of solid propellant rockets.

The carbon-carbon composite using the known structure is well adapted to this application due to its refractory character and to its mechanical and thermal properties which give it, during use, a very good resistance characterised by the total absence of ruptures of even cracks and by an excellent dimensional stability.

However, when the gas passage of the nozzle is cut in a block of composite material using the known structure, the aspect of this structure varies depending on the angles, from one zone to the other of the surface which delimits the cylindrical passage. An irregularity is then observed in the speed of ablation of the material from one point to the other of the surface exposed to the hot gases. This irregularity disturbs the flow of the gases, with, as consequence, an increased inequality of the speeds of wear and tear and a drop in propulsive performance of the motor. In addition, the average speed of ablation of the material is not perfectly reproducible from one test to the other. It is an object of the invention to provide an annular three-dimensional structure combining the advantage of the known three-dimensional structure with the regularity of aspect of the structure on a cylindrical surface about the axis, which, in the particular case of the application to the production of annular pieces such as nozzles of propulsion systems, allows the regularity of the speed of ablation to be guaranteed at any point of the surface delimiting the gas passage and the reproducibility of this speed from one test to the other.

This aim is attained by a structure of the type defined hereinabove in which, according to the invention, the elements of at least of the first and second families are incurved, the direction of incurvation of the elements of the first family being opposite that of the elements of the second family, and the unit cells of the structure conserve substantially the same orientation with respect to the axis of the structure, all around this axis.

Thus a structure is obtained having an axial symmetry of high order, thus particularly well adapted to the production of annular pieces.

By analogy, it may be considered that the unit cells of the structure according to the invention are disposed around the axis like the bricks of a circular construction, i.e. progressively offset angularly to conserve the same orientation at all points with respect to the circular surface of the construction.

According to a particular feature of the structure according to the invention, the parallepipedic unit cell preferably has one edge oriented with respect to the axis of the structure along one of the radial, axial and circumferential directions.

According to a further feature of the structure according to the invention, the unit cell is preferably cubic in the zone adjacent the inner cylindrical surface of the structure.

The invention will be more readily understood on reading the following description with reference to the accompanying drawings in which:

FIG. 1 is a very schematic view illustrating the arrangement of the unit cells of the structure according to a first embodiment of the structure according to the invention.

FIGS. 2A to 2D are perspective views illustrating the manufacture of a structure according to the first embodiment illustrated in FIG. 1, FIG. 3 is a half-view in meridian section of a structure according to the first embodiment illustrated in FIGS. 1 and 2A to 2D.

FIG. 4 very schematically illustrates the arrangement of the unit cells according to a second embodiment of the structure according to the invention.

Figure 5A:
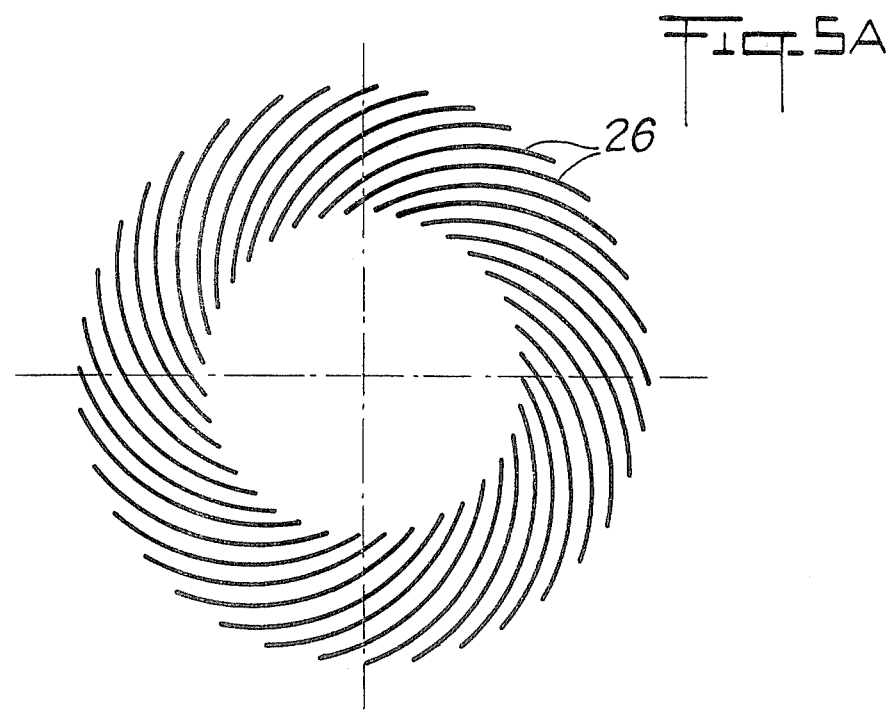
Figure 5B:
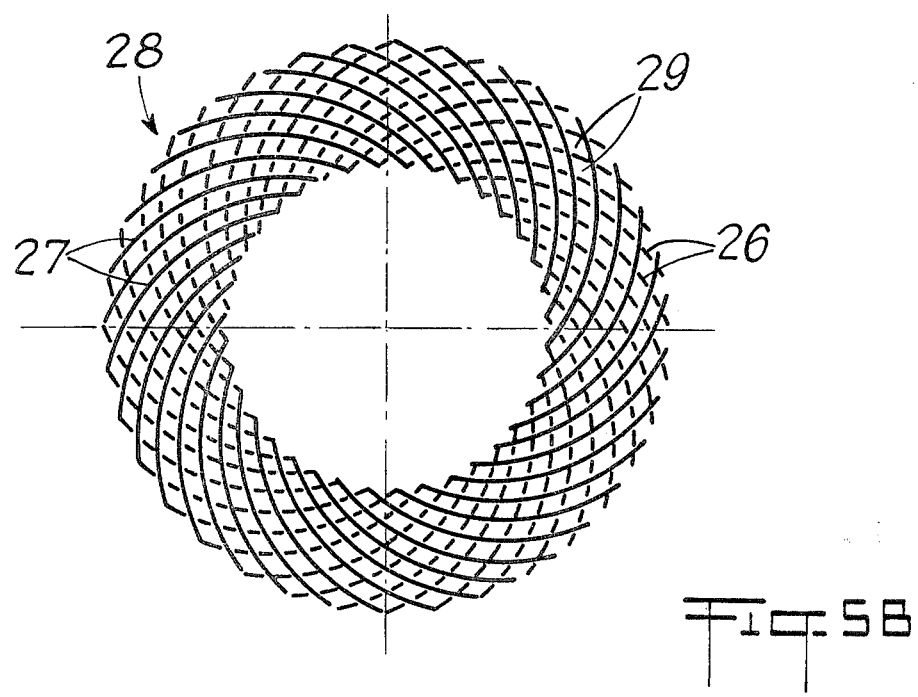

FIGS. 5A and 5B are plan views illustrating the manufacture of a structure according to the second embodiment illustrated in FIG. 4.

FIG. 6 is a half-view in meridian section of a structure according to a second embodiment illustrated in FIGS. 4, 5A and 5B;

FIG. 7 very schematically illustrates the arrangement of the unit cells according to a third embodiment of the structure according to the invention.

FIGS. 8A and 8B are two views in perspective illustrating the manufacture of a structure according to the third embodiment illustrated in FIG. 7, and FIG. 9 very schematically illustrates the arrangement of the unit cells according to a fourth embodiment of the structure according to the invention.

As indicated hereinabove, the structure may be considered as being formed by substantially parallelepipedic unit cells, each cell comprising at least one element of a first family, one element of a second family, one element of a third family and one element of a fourth family. In this unit cell, these elements of the different families are oriented along the four long diagonals of the parallelepiped constituting the cell.

In accordance with the invention, an axial symmetry of high order is given to the structure by progressively incurving the juxtaposition of the unit cells.

Different embodiments of an axisymmetric three-dimensional structure may be envisaged, following, for example, the different orientations taken by the parallelepipedic unit cell within the structure.

A first embodiment of a structure according to the invention will now be described with reference to FIGS. 1, 2A to 2D and 3.

FIG. 1 illustrates an annular piece 10 constituting, for example a blank in which the piece to be manufactured will be machined, and made of a carbon-carbon composite with three-dimensional reinforcement structure.

The piece 10 is formed of unit cells 11 obtained by cutting the piece into sections through planes 12 perpendicular to the axis 13 of the piece, into rings in coaxial cylinders 14 and into sectors through meridian planes 15.

Each cell 11 has the form of a ring sector, which form is similar to that of the parallelepiped, all the more so as the angle separating two adjacent meridian planes 15 is small.

Within an unit cell 11, the elements of the different families of elements of the structure are oriented along the four diagonals of this cell.

The planes 12 preferably delimit sections of equal thicknesses, the cylinders 14 rings of equal thicknesses and the planes 15 sectors of equal angular openings.

Thus, the four diagonals have the same directions in the superposed cells and undergo the same angular shift on passage from one cell to the adjacent cell, said shift being equal to the angular opening of an elementary sector delimited by two adjacent planes 15.

In addition, the elements of the four families constituting the structure all emerge at the same angle from any cylindrical surface of revolution about the axis 13, particularly the cylinder delimiting the inner surface of the piece 10. This angle, as well as the distances between elements of the same family in the axial and circumferential direction depend on the dimensions a, r and c of the unit cells, said dimensions measured respectively in the axial, radial and circumferential direction.

a and r conserve the same value for all the cells, whilst c varies according to the radius.

If an unit cell of given volume is considered, there is a practical limitation to the part of volume which the elements which are imbricated therein, being parallel to the four long diagonals, may effectively occupy.

The volume content of reinforcement in a parallelepipedic cell, i.e. the ratio between the maximum real volume occupied by the elements of the four families and the volume of the cell, attains a maximum value when the cell is cubic. The rate is 75% if the elements are of hexagonal transverse section and 68% is this section is circular.

If the case of a nozzle is envisaged, it is certain that the rate of reinforcement by volume is advantageously as high as possible at the level of the inner surface since it is this surface which will be exposed to the highest stresses.

The unit cell is preferably given a substantially cubic shape at the level of the inner surface of the annular piece 10. For the cells adjacent this surface, a=r=c. The rate of reinforcement by volume then decreases from this inner surface to the outer surface of the piece 10.

In a structure according to the embodiment illustrated in FIG. 1, the elements of each family are disposed along helical paths and are spaced from one another over a conical surface with a semi-vertex angle equal to 45°. The elements of the first and second families are disposed alternately on superposed cones and have opposite directions of incurvation, whilst the elements of the third and fourth families are also disposed alternately, and with opposite directions of incurvation, on superposed cones, these cones being of the same axis but opposite those carrying the elements of the first and second families, as described in detail in Example 1 hereinbelow.

When rigid elements such as carbon rods are used for making the structure, it proves difficult, if not impossible, to construct a structure with helical elements disposed as indicated hereinabove.

An example of manufacture of a structure very similar to this model without using helical elements is described hereinafter.

EXAMPLE 1

All the elements used for making the structure are carbon elements which have a constant circular transverse section of 3 mm diameter and a length of 103.5 mm and which are incurved with a radius of curvature of 90.2 mm.

Figure 2A:
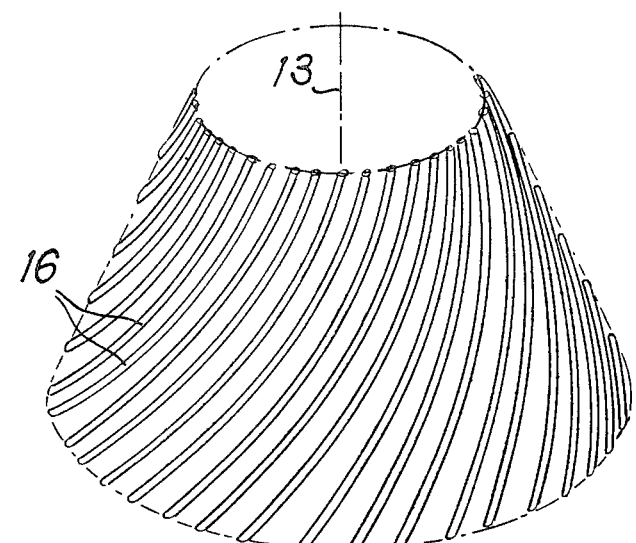
Figure 2B:
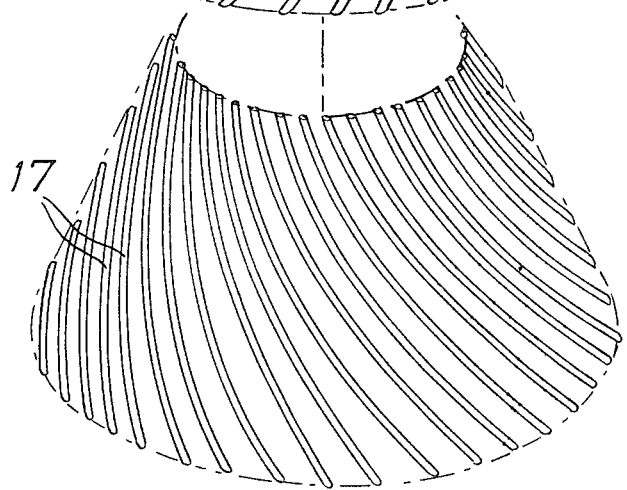
Figure 2C:
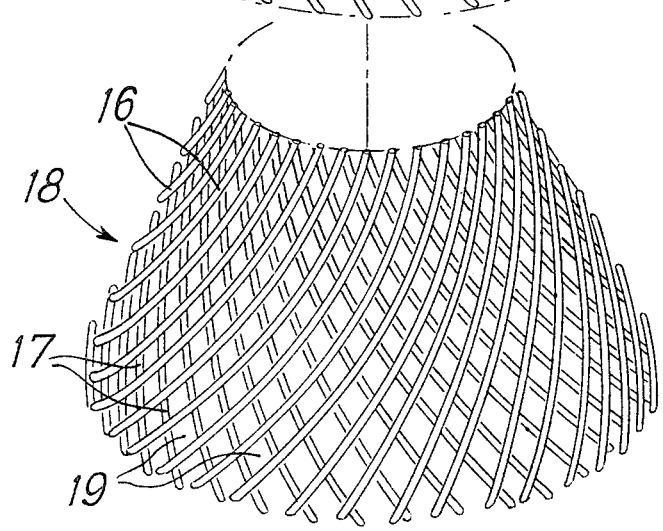

36 Similar elements 16 are disposed as a frustum of a cone with semi-vertex angle equal to 45° and of which the diameters of the bases are respectively equal to 100 mm and 200 mm (FIG. 2A). These elements form a first sheet and have similar paths of helical aspect characterised by the same direction of rotation with respect to axis 13. The elements 16 are spaced apart from one another and regularly shifted by 10° with respect to one another.

A second sheet is made with 36 other elements 17, this second sheet being distinguished from the first only by the direction of incurvation, of the elements with respect to the axis 13.

The first and the second sheet are superposed by interfitting the conical frustums which they form. The assembly of these two sheets constitutes a grid 18 which is partially visible in FIG. 2C.

The position of the sheets forming the grid 18 may be fixed for example by gluing the elements 16 and 17 together at their points of intersection. The temporary supports used for the formation of each sheet, for example, rings materialising the circumferences of the bases of each conical frustum, may then be withdrawn.

A plurality of identical grids 18 are then stacked by fitting on one another, strictly respecting their superposition. This stack constitutes two of the four families of the structure.

The other two families of the structure must have a symmetrical arrangement to that of the stack of grids 18 with respect to a plane perpendicular to the axis 13 and passing at the centre of the height of this stack.

The practical positioning of the elements of the last two families is effected by introduction of the elements individually in the curvilinear spaced formed by the successive openings 19 of the superposed grids 18. This positioning is preferably, but not necessarily, effected layer on layer and requires no particular measure nor tool, the stacking of the grids 18 ensuring a precise guiding of the elements of the last two families.

The elements 16' and 17' of the two last sheets are disposed as conical frustums with the same axis as those bearing elements 16 and 17 but opposite said latter, as illustrated very schematically in FIG. 2D.

FIG. 3 schematically illustrates a half meridian section through the structure thus formed. This structure is complete and according to the invention only in the zone, or heart, where elements of the four families are simultaneously located.

In the present example, the heart 20 has a section of more or less elongated hexagonal form depending on the number of sheets in place. Four marginal zone 21 of triangular section border the heart 20 and are subsequently eliminated.

By stacking eighteen grids 18 as described hereinabove and introducing into the meshes of these grids 1296 circular elements disposed in 36 conical sheets, an annular structure is produced having the following dimensions:

inner diameter = 100 mm
outer diameter = 200 mm
Heart having a total height of 150 mm (measured between the apices parallel to axis 13).

The volume content of reinforcement of this structure has a value regularly decreasing from the inner cylindrical surface where it is 68% to the outer cylindrical surface where it is 48.1%.

This gradient of the rate of reinforcement as a function of the diameter is moderate and perfectly compatible with the expected properties of such a material for producing pieces such as nozzles of solid propellant rockets.

According to the first embodiment of structure according to the invention, the three edges of the unit cell 11 are oriented in the axial, radial and circumferential directions.

According to a second embodiment (FIG. 4), one of the edges of the unit cell 22 is disposed in the radial direction of the annular piece 23 and the two diagonals of the face of the cell perpendicular to this edge are oriented respectively in the axial direction (parallel to the axis 24) and the circumferential direction.

Particularly within the scope of the application of the piece 23 to the manufacture of nozzles or like pieces, the cell 22 is preferably cubic at the level of the inner cylindrical surface of the piece 23. The axial diagonal and the radial edge each preferably conserve a constant length in the whole piece, whilst the circumferential diagonal has a length proportional to the diameter.

The elements of the structure are distributed in:

two families of elements having a spiral path and disposed in alternate sheets along planes perpendicular to axis 24;

two families of straight elements disposed in alternate sheets in meridian planes.

An example of a second embodiment of the structure according to the invention is given hereinafter. The manufacture is simplified by using elements in the form of circular segments in place of spiral elements.

EXAMPLE 2

Two types of elements are used for making the structure. The first and the second family are formed of incurved elements of length 103.5 mm, with a radius of cruvature of 90.2 mm. The third and fourth family are formed by straight elements of length 86.6 mm.

36 Incurved elements 26 are disposed on a flat ring included between an outer diameter of 241.4 mm and an inner diameter of 141.4 mm (FIG. 5A).

Each element describes on this ring a spiral path from the inner diameter to the outer diameter and characterised in particular by its direction of rotation.

The 36 elements 26 which constitute a sheet have the same direction of rotation and are regularly shifted by 10° with respect to one another.

On the other hand, a second sheet is made with 36 other, identical elements 27, which differs from the first only by the direction of incurvation. The second sheet is superposed on the first so that the interfitting assembly of these two sheets constitutes a grid 28 which may be fixed in this position for example by gluing the elements together at their points of intersection (FIG. 5B).

A plurality of identical grids are then stacked, it being ensured that each grid is shifted in rotation by 5° with respect to each of its adjacent ones. This stack of flat grids constitutes half of the structure, i.e. the first two of the four reinforcing families.

The other two families are constituted by straight elements disposed in meridian planes.

Each straight element is introduced individually in the rectilinear spaces formed by the successive openings 29 of the superposed grids 28. Further to the dimensions adopted in this example, the straight elements thus positioned for parallel sheets alternately making angles of $+$ or $-35°$ ¼ with respect to the axis 24 of the annular structure.

The positioning of these straight elements may be effected in any order and requires no particular measure nor tool, the stack of the grids 28 ensuring a precise and strict guiding of the elements of the last two families.

The structure thus formed in complete and in accordance with the invention only in the part, or heart, where elements belonging to the four families simultaneously exist.

As illustrated in FIG. 6, the heart 30 is hexagonal in form and is extended at the top and bottom by incomplete marginal zones 31 which must be eliminated.

By stacking 30 flat grids 28 such as described hereinabove and introducing between these grids 2160 straight elements distributed in 144 vertical, regularly alternate sheets, each composed of 15 elements, an annular structure is made having the following dimensions:

inner diameter 141.4 mm
outer diameter 241.4 mm
heart of hexagonal section with a total height (between apices) of 180 mm.

The volume content of reinforcement has a value which decreases regularly from the inner diameter where it is 68% to the outer diameter where it is 50%.

This gradient of the rate of reinforcement as a function of the diameter, as in the case of Example 1, is perfectly compatible with the expected properties of such a material for making pieces such as nozzles for solid propellant rockets.

FIG. 7 illustrates a third embodiment of an annular structure according to the invention.

According to this embodiment, each unit cell 32 of the annular piece 33 is oriented so as to have an edge parallel to the axis 34 of the piece 33. The two diagonals of the face of the cell perpendicular to this axial edge are oriented, respectively, in the radial direction and in the circumferential direction.

This cell 32 has, like before, a substantially parallelepipedic form.

The cell 32 is preferably cubic at the level of the inner cylindrical surface of the ring 33, the axial edge and the radial diagonal each have a constant length in the whole piece 33, and the circumferential diagonal has a length which varies proportionally to the diameter.

The elements constituting the structure are distributed in two types:

two families of elements having a helical path and disposed in alternate sheets in coaxial cylinders, and two families of rectilinear elements disposed in alternate sheets in meridian planes.

For making such a structure, the helical elements are advantageously shaped as they are positioned, as in the following example.

EXAMPLE 3

An axisymmetrical three-dimensional structure according to the third embodiment of the invention may be made as follows:

To make the sheets of helical elements, a continuous roll is used, having a circular section of 3 mm diameter and sufficiently supple to be able to be helically coiled on a circular mandrel.

On a mandrel 35 of diameter 137 mm and length 306 mm, 36 helical elements 36, regularly shifted by 10° with respect to one another, are successively deposited by winding, the angle of winding being such that the pitch of the helices is equal to the length of the mandrel (FIG. 8A).

On this first sheet is similarly deposited a second sheet of elements 37 with direction of rotation about the mandrel opposite that of the lements 36 (FIG. 8B). A third sheet, of the same direction as to the first, but shifted by 5° is then deposited, then a fourth sheet of the same direction as the second, but shifted by 5° . . . and so on, each time changing the direction with respect to the last sheet positioned and the angular shift with respect to the second to last.

The superposition of 20 sheets (10 of each direction) brings the outer diameter of the structure to 257 mm.

In the openings of this double winding are then introduced the straight elements with a diameter of 3 mm and of length 73.5 mm. 4464 elements thus form 144 meridian sheets each of 31 elements. In the successive sheets the elements alternately make angles of $+$ or $-54°\frac{3}{4}$ with respect to the axis 34 of the mandrel.

The heart of the structure thus formed has a hexagonal section having the following dimensions:

inner diameter 137 mm
outer diameter 257 mm
height between apices 306 mm.

The volume content of reinforcement has a value regularly decreasing from the inner diameter where it is 68% to the outer diameter where it is only 48%.

Finally, FIG. 9 illustrates a fourth embodiment of an annular structure according to the invention. According to this embodiment, each cell 42 has an edge disposed in the circumferential direction of the annular piece 43, whilst the two diagonals of the face of the cell perpendicular to this edge are oriented respectively in the radial direction and parallel to the axis 44 of the piece 43.

The cells 42 are substantially parallelepipedic and preferably cubic at the level of the inner surface of the piece 43. The axial and radial diagonals each conserve a constant length in the whole piece 43 whilst the length of the circumferential edge is proportional to the diameter.

The elements constituting the structure are distributed in two types;

a first and a second family of elements having helical paths and disposed in alternate sheets in coaxial cylinders, and a third and fourth family of spiral elements disposed in sheets in planes perpendicular to the axis 44, the direction of incurvation of the elements being alternately reversed in the superposed sheets.

For making the structure, one may proceed as in Example 3 hereinabove for positioning the first and second sheets (the pitch of the helical elements is, however, in the present case substantially longer). The elements of the third and fourth sheets may be approximately circular elements positioned in the openings of the grids constituted by the superposition of the first and second sheets.

Four particular arrangements of the unit cells in the annular piece have been described hereinabove.

Other arrangements may of course be suitable within the scope of the present invention, on condition that the unit cell conserves, in the whole annular piece, the same orientation with respect to the axis of the piece.

The production of the structure by means of rigid or supple elements of circular section has been envisaged hereinabove.

By way of variants, rigid elements and supple elements may be combined within the same structure and elements having a non-circular transverse section, for example polygonal, may be used.

In addition, although carbon is the preferred material for constituting the elements of the structure within the scope of the application as reinforcement for composite material intended for making nozzles, other materials may be used as a function of the applications envisaged.

The structure according to the invention having been manufactured, it is subjected to a so-called coating treatment when it is intended to constitute a reinforcement embedded in a composite material.

In the case, for example, of a carbon-carbon composite material, the three-dimensional structure composed of carbon elements may be subjected to a liquid impregnation, a gaseous infiltration or a liquid infiltration. These coating processes are well known per se and described in particular, in French Pat. No. 2 276 916 which has already been mentioned. They essentially consist in filling the porosities of the structure by carbon deposited by pyrolysis, a coating which may require a plurality of successive cycles of impregnation and/or infiltration.

What is claimed is:

1. An annular three-dimensional structure, which may be used in particular as reinforcement, comprising a regular interleaving of elongated filiform elements distributed in first, second, third and fourth families, the elements of each family being disposed in parallel, regularly spaced apart sheets themselves constituted by elements extending substantially parallel to one another and being regularly spaced apart, the sheets of the first and second families being alternately disposed in adjacent parallel layers and, similarly, the sheets of the third and fourth families being alternately disposed in adjacent parallel layers, these latter being inclined with respect to those of the first and second families, the elements in each sheet having a different orientation from that of the elements of the adjacent parallel sheet of another family, said structure appearing as being formed by the regular repetition of a basic motif, or unit cell, inscribed in a parallelepiped containing at least one segment of element of each of the four families, these elements being oriented substantially along the four long diagonals of this parallelepiped, wherein the elements of at least the first and second families are incurved, the direction of incurvation of the elements of the first family being opposite that of the elements of the second family, and the unit cells of the structure conserve substantially the same orientation with respect to the axis of the structure, all around this axis.

2. The structure of claim 1, wherein the parallelepipedic unit cell has at least one edge oriented with respect to the axis of the structure along one of the radial, axial and circumferential directions.

3. The annular structure of either one of claims 1 or 2, wherein the unit cell is cubic in the zone adjacent the inner cylindrical surface of the structure.

4. The structure of claim 1, wherein the elements of the four families emerge at the same angle from any cylindrical surface of revolution about the axis of the structure.

5. The structure of claim 1, wherein the sheets constituting at least the first and second families are each formed by elements disposed on a surface of revolution with respect to the axis of the structure.

6. The structure of claim 5, wherein the elements disposed on the surface of revolution are regularly distributed angularly thereon with respect to the axis of the structure.

7. The structure of claim 5, wherein said surface of revolution is conical.

8. The structure of claim 5, wherein said surface of revolution is plane and perpendicular to the axis.

9. The structure of claim 5, wherein said surface of revolution is a cylinder.

10. The structure of claim 1, wherein the elements of the third and fourth families are rectilinear.

11. The structure of claim 1, wherein the elements of the third and fourth families are incurved.

12. The structure of claim 1, wherein the four families are each constituted by elements of substantially helical form disposed regularly on truncated surfaces with semi-vertex angle equal to 45°.

13. The structure of claim 1, wherein the elements constituting the first and second families are disposed in planes perpendicular to the axis of the structure and are incurved substantially along a spiral path, and the third and fourth families are constituted by straight elements disposed in meridian planes.

14. The structure of claim 1, wherein the elements constituting the first and second families are disposed along cylindrical surfaces of revolution about the axis of the structure and are substantially helical in form.

15. The structure of claim 14, wherein the elements of the third and fourth families are straight and disposed in meridian planes.

16. The structure of claim 14, wherein the elements of the third and fourth families are incurved and substantially spiral in form.

* * * * *